(12) United States Patent
Turner

(10) Patent No.: US 7,819,414 B2
(45) Date of Patent: Oct. 26, 2010

(54) SPECIAL NEEDS ADAPTIVE TRICYCLE

(76) Inventor: Jaysen John Ivan Turner, 5149 Rabeneck Way, Fair Oaks, CA (US) 95628

( * ) Notice: Subject to any disclaimer, the term of this patent is extended or adjusted under 35 U.S.C. 154(b) by 583 days.

(21) Appl. No.: 11/800,326

(22) Filed: May 4, 2007

(65) Prior Publication Data

US 2008/0007026 A1 Jan. 10, 2008

Related U.S. Application Data

(60) Provisional application No. 60/805,336, filed on Jun. 20, 2006.

(51) Int. Cl.
*B62K 5/00* (2006.01)
(52) U.S. Cl. ....................... 280/282; 280/293
(58) Field of Classification Search ................. 280/282, 280/244, 246, 255, 258, 230, 233, 294, 295, 280/260, 288.4, 293, 304.5
See application file for complete search history.

(56) References Cited

U.S. PATENT DOCUMENTS

| | | | |
|---|---|---|---|
| 293,581 | A | 2/1884 | Kressly |
| D27,660 | S | 9/1897 | Anschuetz |
| D57,453 | S | 3/1921 | Oosterveer |
| D127,578 | S | 3/1941 | Cash |
| 3,096,100 | A | 7/1963 | Clarke et al. |
| D214,354 | S | 6/1969 | Ross |
| D217,354 | S | 4/1970 | Takashima |
| 3,595,599 | A | 7/1971 | Black |
| 3,734,535 | A | 5/1973 | Sidiauskas |
| 3,961,810 | A | 6/1976 | Arico |
| 4,012,054 | A | 3/1977 | Moore |
| 4,154,452 | A | 5/1979 | Newman |
| D263,293 | S | 3/1982 | Janson |
| 4,432,561 | A | 2/1984 | Feikema et al. |
| 4,572,535 | A | 2/1986 | Stewart et al. |
| 4,638,685 | A | 1/1987 | Cigolini |
| 4,705,284 | A * | 11/1987 | Stout ........................ 280/250.1 |
| 4,789,173 | A | 12/1988 | Lofgren et al. |
| 4,826,190 | A | 5/1989 | Hartmann |
| 4,873,886 | A | 10/1989 | Renner |
| 5,028,066 | A | 7/1991 | Garth |
| 5,071,150 | A | 12/1991 | Conrad |
| 5,154,096 | A | 10/1992 | Geller et al. |
| 5,242,183 | A | 9/1993 | Oberg et al. |
| 5,568,935 | A | 10/1996 | Mason |
| 5,765,871 | A * | 6/1998 | Wyman et al. ............... 280/827 |
| 5,899,117 | A | 5/1999 | Newkirk |
| 6,098,493 | A | 8/2000 | Cortes |
| 6,312,001 | B1 | 11/2001 | Boyer |
| 6,409,195 | B1 * | 6/2002 | Adams ........................ 280/250 |

(Continued)

*Primary Examiner*—Anne Marie Boehler
(74) *Attorney, Agent, or Firm*—Law Offices of David M. Lang; David M. Lang

(57) ABSTRACT

An apparatus adapted for use as a therapeutic tricycle; said apparatus including in part, a specialized lever system permitting optimal rider center of mass positioning; an optional steering lock out system; an embodiment prescribing optimized apparatus dimensions based upon rider weight to enhance apparatus stability; an improved chain management system; an improved wheelie bar system; a shock absorbing system; the combination permitting enhanced apparatus stability and ability to perform a varied array of maneuvers providing exercise, therapeutic, and recreational advantages which particularly benefit disabled children. A method of exercising tendons and/or heel cords using a specialized adaptive tricycle.

11 Claims, 7 Drawing Sheets

U.S. PATENT DOCUMENTS

| | | |
|---|---|---|
| 6,659,488 B1 | 12/2003 | Beresnitzky et al. |
| 6,811,173 B1 | 11/2004 | Shih |
| 6,907,952 B2 | 6/2005 | Jones |
| D518,417 S | 4/2006 | Oosterveer |
| 7,090,227 B2 | 8/2006 | Morin |
| 2002/0113402 A1* | 8/2002 | Ochs .......................... 280/282 |
| 2004/0164515 A1 | 8/2004 | Gunter et al. |
| 2005/0064998 A1 | 3/2005 | Hill |
| 2006/0048599 A1 | 3/2006 | Wald |
| 2007/0284843 A1* | 12/2007 | Copeland ................... 280/234 |

* cited by examiner

SPECIAL NEEDS ADAPTIVE TRICYCLE

CROSS-REFERENCE TO RELATED APPLICATIONS

This application claims the benefit under 35 U.S.C. §119 (e), to U.S. Provisional Application U.S. 60/805,336, filed Jun. 20, 2006, entitled "TRIDYNAMICS" which is incorporated by reference into this application as if fully set forth herein.

FIELD OF THE INVENTION

The present invention relates to human powered vehicles generally and therapeutic multi-wheeled vehicles more specifically.

BACKGROUND

Multi-wheel vehicles, including tricycles, are well known in the prior art. Tricycles are known to have a specific application and use for disabled individuals. For many, a properly functioning tricycle serves as a primary means of locomotion and makes possible goals and objectives otherwise beyond reach.

Prior art tricycles, when utilized in a therapeutic capacity, are known to have deficiencies. The most concerning deficiency is the tendency for the apparatus to tip when the rider turns. Falls from such a tricycle are always problematic, however, they are particularly devastating when sustained by individuals with specific preexisting motor impairments that may limit or prevent self protective actions during a fall.

SUMMARY

The present invention relates to a multi-wheel human powered tricycle which has superior, stimulus, therapeutic, conditioning, and health and safety benefits when compared to prior art devices. In specific, one aspect of the invention is to provide a multi-wheel tricycle vehicle with a wheelie bar, preferably suspension mounted, capable of keeping tricycle pitch within a defined limit. Another aspect of the invention provides a steering lock-out system which maintains the pivotable rotation of the front wheel within certain predefined ranges. The present invention further provides a dynamic stabilization system comprised, in part, of a dual wishbone lever system, coupled to a tricycle frame, which provides enhanced stability and, more particularly, dynamic stability during turns. Another important aspect of the present invention is the optimization of the rider's position relative to the center of mass of the rider and rider/apparatus combination or ballast/apparatus combination. Another important aspect of the present invention is a shock-absorbing scheme that prevents falls and permits a more refined apparatus use. Another aspect of the present invention is an optimized positioning of the wheelbase, a wheelie bar, and seating surface for a particular range of rider weights. An additional aspect of the invention is an improved chain management system, providing, in part, a tubular shielding system for the lower aspect of a chain utilized in a standard bicycle/tricycle drivetrain. Another advantage of the present invention will be to provide a user physical stimulus and exercise generally, and more specifically promote exercise of the lower extremities and stretching of heel cords. It is believed that use of this apparatus can deliver may health benefits, including stimulation of a patient's heel cords, which may avert contractures associated with conditions such as cerebral palsy, and the like, and the need for an unpleasant and possibly harmful heel cord tendon release procedure. The combination of the structural features permits the user to perform multiple maneuvers with the apparatus including but not limited to: rapid cornering and turning, enhanced apparatus speeds, evasive maneuvering, responsive front end pitching, forward and backward wheelies, rotational wheelies through a 360 range, multiple revolution wheelies including 540, 720 degree spins, and high velocity wheelie spins. This results in enhanced motivation, self-satisfaction, and quality of life imparted to a disabled user able to perform impressive physical maneuvers.

It is intended that any other advantages and objects of the present invention that become apparent or obvious from the detailed description or illustrations contained herein are within the scope of the present invention.

DETAILED DESCRIPTION OF CERTAIN ASPECTS OF THE PREFERRED AND ALTERNATIVE EMBODIMENTS

Figure 1:
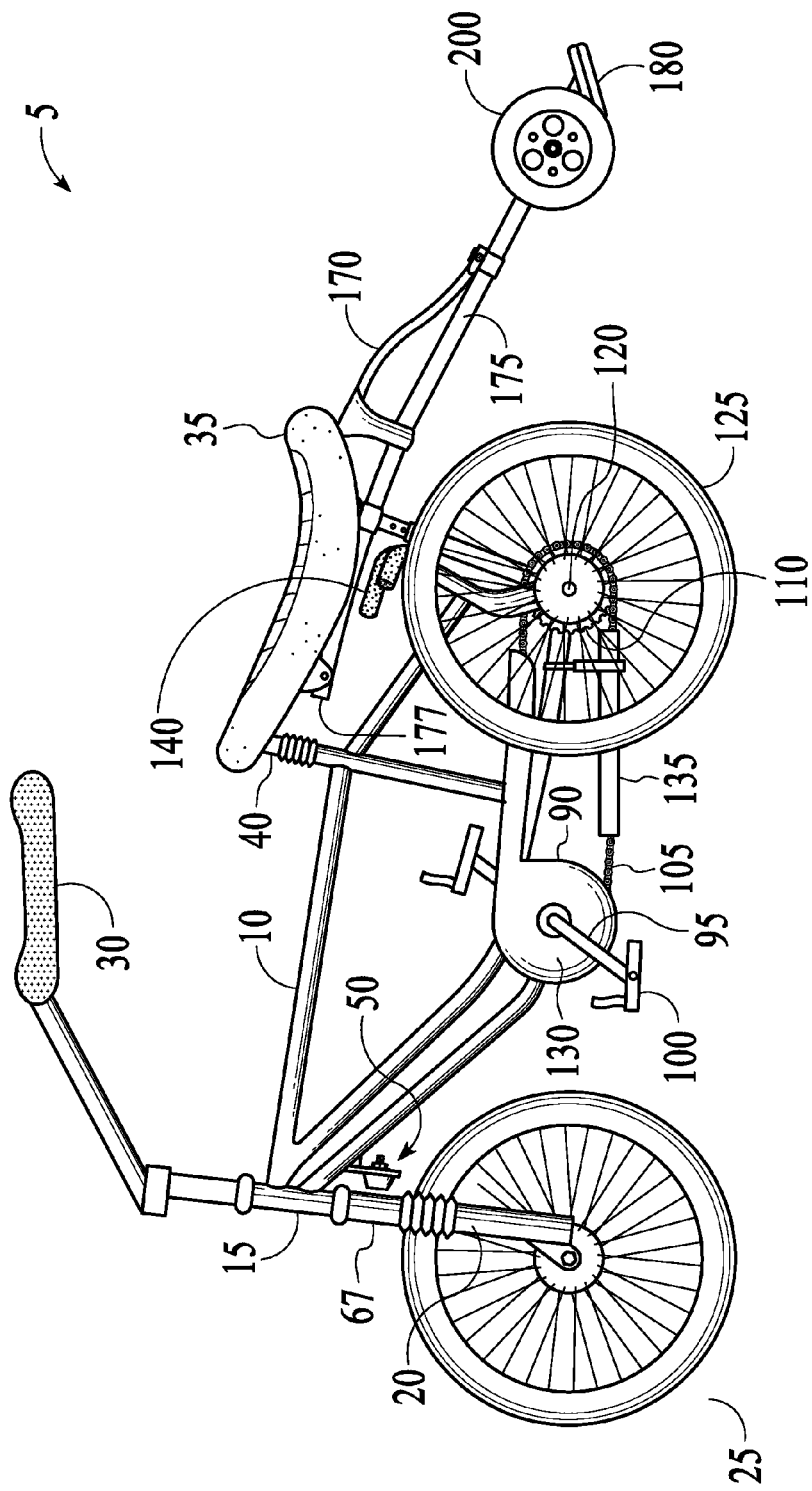
FIG. 1 is a side elevation view of the apparatus.

Referring now descriptively to the drawings, the attached figures illustrate example embodiments of the present invention. FIG. 1 depicts an example embodiment specialty needs tricycle. The tricycle generally 5 has a rigid main frame 10. Mounted to, or incorporated as a part of frame 10, is a fork tube 15 through which passes a steering means, such as a standard stem-headset articulation (not shown), rendering fork 20 and front wheel 25 pivotably controlled by and coupled to a steering means such as handlebars 30 through use of the stem-headset articulation. Preferably, fork 20 contains a set of shock absorbers.

A front wheel 25, is coupled by screw, fastener, or quick release tire securing means, to fork 20. In a preferred embodiment, handlebars 30 are rotatably coupled to the topmost portion of fork 20 through stem-headset articulation, such that handlebars 30 may be rotated forward and backward relative to the front and back of the tricycle 5, thus permitting additional space for a user to mount/dismount the apparatus. In one embodiment, seat 35 is mounted to frame 10 through a front seating post 40 and rear seating post 45.

Figure 3:
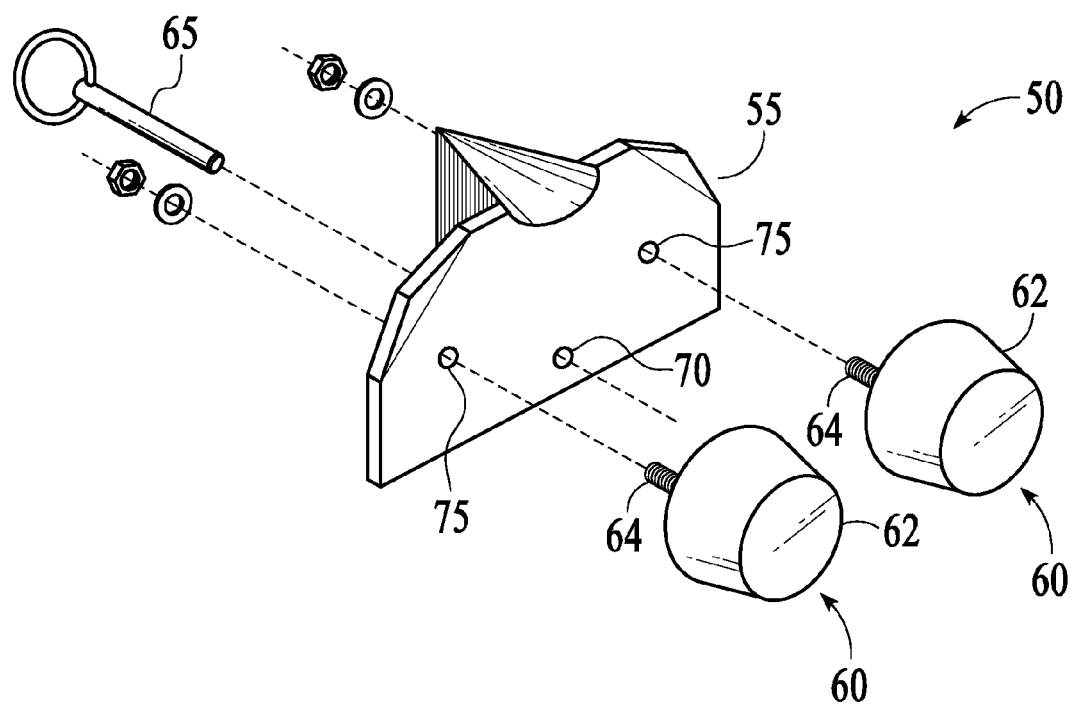
FIG. 3 is an exploded perspective view of an embodiment steering lock-out system.

In one embodiment, an optional steering lockout system 50, is mounted on the underside of frame 10 in close proximity to fork 20. The system, now illustrated by FIG. 3, comprises a mounting bracket 55 affixed to frame 10, two rubberized limiters 60 affixed to mounting bracket 50, and a pin 65 insertable through a fork aperture 67 in the centermost and proximal aspect of fork 20. Mounting bracket 55 is an integrally formed rigid bracket having a portion of which mounted to said frame and a portion disposed substantially perpendicularly, wherein said perpendicular portion has a centermost aperture 70 and two lateral apertures 75. A removable pin 65 is insertable through said centermost aperture 70 in mounting bracket 55 and then through fork aperture 67. A pair of rubberized limiters 60, having a rubberized portion 62 and a threadable bolt portion 64, extending substantially perpendicular from the end of said rubberized portion 62, wherein said bolt portion 64 of limiters are capable of being inserted through lateral apertures 75 of mounting bracket 55 and screwably attached thereto using at least one washer and a nut.

The system has two example modes of operation. In the first mode of operation, pin 65 is inserted through mounting bracket 55, and thereafter through the suitably sized aperture in the centermost and proximal aspect of fork 20, then fork aperture 67 thereby rendering fork 20 pivotable through a range of approximately 4 degrees. In a second mode of operation, pin 65 is removed, two rubberized limiters 60 make contact with either side of fork 20, and halt further pivoting, if the user attempts to pivot the wheel beyond a total pivotable range of approximately 44 degrees.

It should be noted that steering lockout system 50 is not required for apparatus dynamic stability or stability in general. The system will merely confine the piviotable range of handlebar/fork/wheel arrangement within a defined range where desired. For example, when the tricycle is used in a competitive athletic capacity (e.g. race or training on a standard track), or riding on a defined trail, steering lockout system 50 can be set to keep the apparatus moving in a relatively straight forward direction. Alternatively, the system can be set to approximate the track's turn in a given lane (e.g. 22 degree turn). In this way, steering lockout system 50 can facilitate exercise and stimulus and permit the rider to concentrate on lower extremity conditioning without the need to continually divert attention to apparatus direction in an effort to prevent sudden apparatus tipping.

Figure 6:
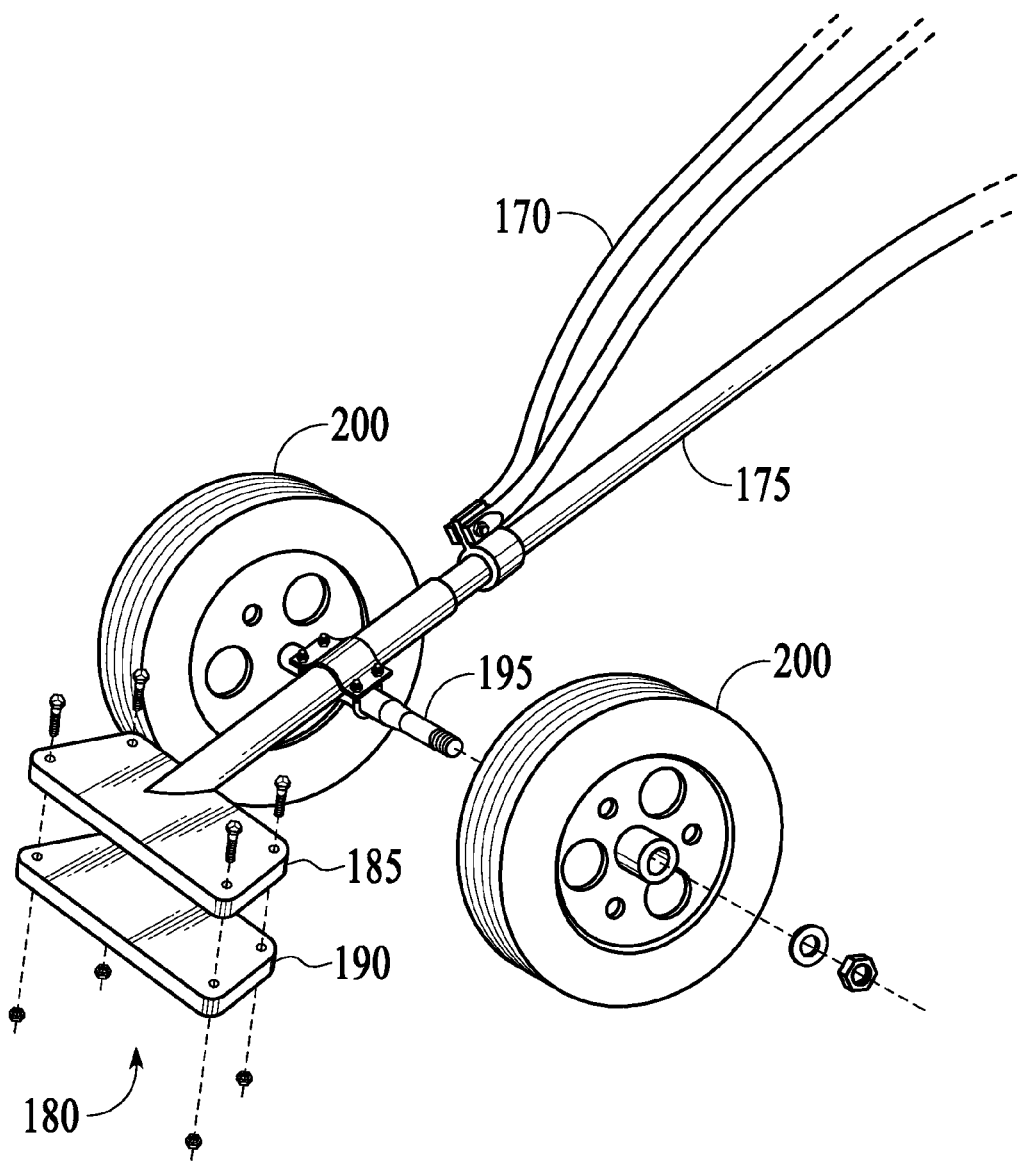
FIG. 6 is an exploded perspective view of an embodiment skid plate.

A pedal powered drive train means 80 is coupled to frame 10. For example, a conventional power transmitting crank assembly, illustrated by FIG. 1 comprises at least a crankshaft housing 85, sprocket wheel 90, crank arms 95, pedals 100, a chain 105, and a rear sprocket 110 (FIG. 6). In a preferred embodiment, a modified set of pedals 100 have a means to prevent slippage, including straps, ties, fasteners, and the like, including, in one embodiment, a widened foot rest with VELCRO fasteners. A freely rotatable rear axle 120 passes through frame 10, and thereafter to a pair of rear wheels 125. A rear sprocket 110 is fixedly mounted on rear axle 120 and is driven by chain 105 and powered through pedal rotation of sprocket wheel 90. In a preferred embodiment, a gear ratio of 1.4:1 is utilized, although an alternative gear ratio could be used. Additionally, in an alternative embodiment, a plurality of gears using external or internal gearing (i.e. derailleur or internal hub gearing) may be used. A drum brake may be mounted on rear axle 120 that may be cable actuated by a hand lever, the lever placed in a location accessible to the rider, such as handlebars 30.

Figure 4:
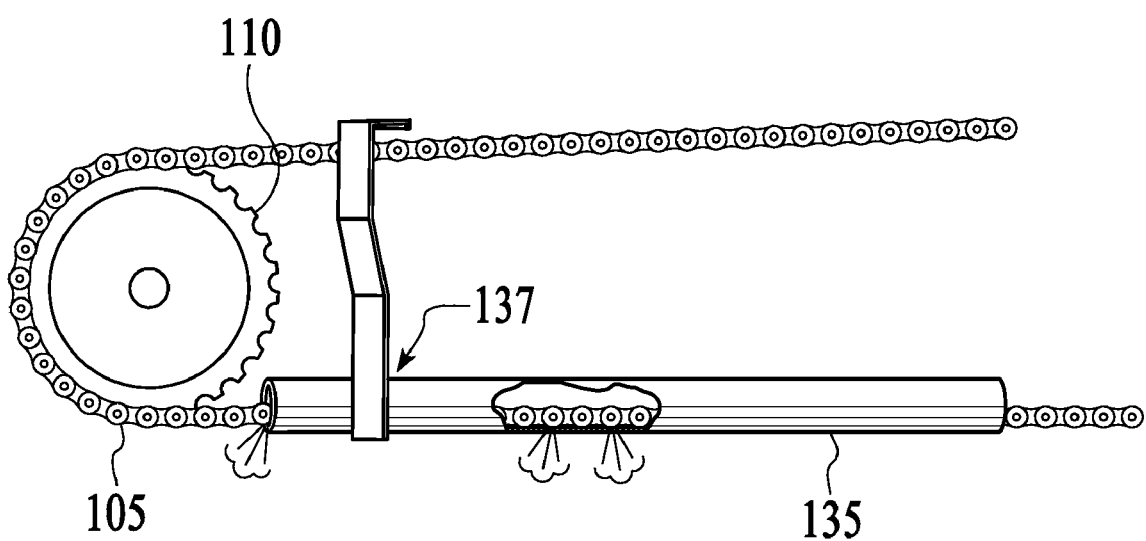
FIG. 4 is a side elevation view of an embodiment chain management system.

In one embodiment, a chain management system 125, an embodiment of which illustrated by FIG. 4, is comprised of an upper chain guard 130 and a lower chain tube 135 comprised of any rigid material, preferably PVC plastic. The upper chain guard 130 shields the upper aspect of chain 105 from the user. Lower chain tube 135 is comprised of an elongated tubular member which is affixed to frame 10 or upper chainguard 130, by bracket 137 and extends substantially the length of the lower aspect of chain 105, beginning just after sprocket wheel 90 and terminating just before rear sprocket 110. Chain 105, after leaving sprocket wheel 90, passes through lower chain tube 135 whereby the lower aspect of the chain is shielded from contact with the user. As chain 105 leaves rear sprocket 110, the upper aspect of chain 105 is shielded by upper chain guard 130 mounted to frame 10. Lower chain tube 135 is further assistive in preventing chain derailment attributable to a relatively high-energy transfer resulting in chain distortion. Lower chain tube 135 also serves to minimize user contact with the chain which could cause frictional injury from the chain, or more commonly, soiling of skin or clothing with grease, dirt, and debris from the chain. Further, the limited friction between chain 105 and innermost aspect of lower chain tube 135 results in a pleasing soft motoring or tailpipe sound.

Figure 2:
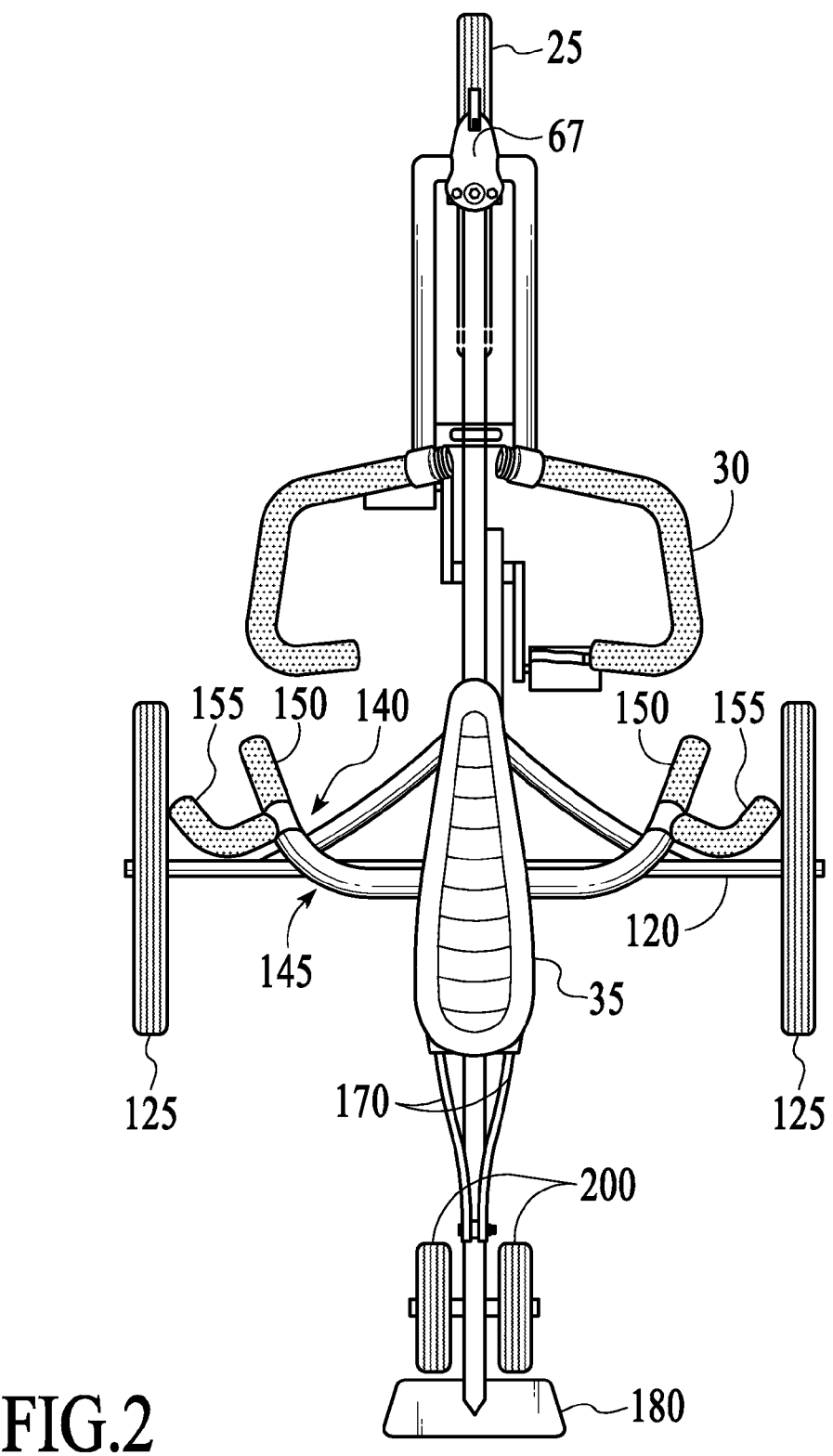
FIG. 2 is top view of the apparatus.

Turning now to FIG. 2, a dual wishbone lever system 140, an embodiment is mounted just rearward of rear axle 120 in a horizontal plane relative to the ground and perpendicular to the long axis of the frame. In a preferred embodiment, lever system 140 has a forward bend 145 after which the lever branches into a pair of forwardmost handles 150 and a pair of lateral handles 155. In one embodiment, a relatively triangular projection of frame 10 terminates in plateau 160, and, in this embodiment, lever system 140 is coupled to plateau 160 by an affixing means. In one embodiment, lever system 140 is flexibly affixed by a means permitting upward and downward movement of lever system 140 relative to the ground when upward or downward manual pressure is exerted on a forwardmost handle 150 or a lateral handle 155. In one specific example, the affixing means is a plurality of C-clamps. In another example embodiment, lever system 140 is itself flexible in and rigidly fixed in a suitable location on frame 10, where downward or upward movement of the system is possible. It is possible to practice the invention utilizing a variety of handle types, direction, and orientation without departing from the spirit and scope of the invention.

Figure 5:
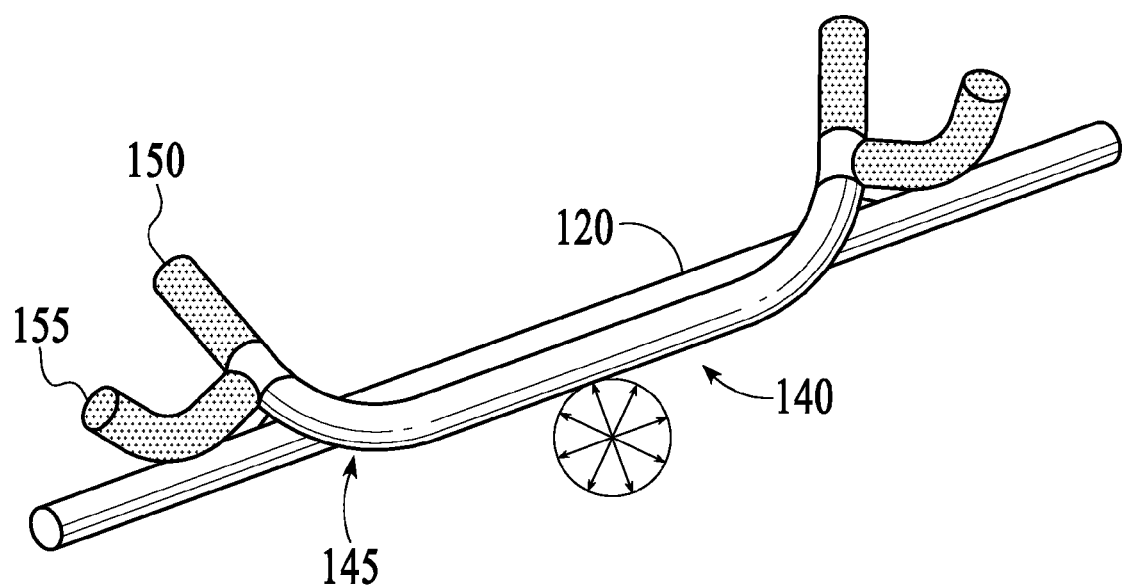
FIG. 5 is a top view of an embodiment lever system.

FIG. 5 illustrates a top view of an embodiment of lever system 140. In one specific non-limiting example, the distance between the two forwardmost handles 150 is 19 inches at geometric center of the handle's terminal aspect, and the distance between the two lateral handles 155 is 26.5 inches at the geometric center of the handle's terminal aspect. Lever system 140 is optimally positioned approximately 1.5 inches inwardly from the hub of rear wheels 125 on each side.

Turning now to the wishbone lever system 140 in an example mode of operation demonstrating the dynamic stabilization process using lateral handles 155, when the rider wishes to make a right turn and thus pivots the front wheel rightwardly, a right lateral handle 155 may be pushed downwardly. This displaces the rider's center of mass rightwardly thus resulting in a more stable and precise turn that is executed with rider less effort. During a right turn, when a right lateral handle 155 is pulled upwardly, the rider center of mass shifts in the opposite direction resulting in a slower turn. During a left turn, when a right lateral handle 155 is pulled upwardly, the rider/apparatus center of mass is displaced leftwardly, thus resulting in a more stable and precise turn that is also executed with less rider effort. Generally, when the rider turns left or right, the rider will push downwardly on the handle corresponding to the direction of the turn, to stabilize the rider's center of mass relative to the apparatus.

Regarding the pair of forwardmost handles 150, as an example, when a user wishes to make a right turn, a right forwardmost handle 150 may be pushed downwardly, displacing the rider center of mass rightwardly and frontally thus resulting in a more stable turn that is also executed with rider less effort. During a right turn, when a right forwardmost handle 150 is pulled upwardly, the rider center of mass is displaced leftwardly and backwardly resulting in a slower turn and is assistive in increasing the pitch of the apparatus to raise the front wheel and perform wheelies, particularly while turning. During a left turn, when the right forwardmost handle is pulled upwardly, the rider center of mass is displaced leftwardly, and backwardly thus resulting in a slower turn and is assistive in increasing the pitch of the apparatus to raise the front wheel and perform wheelies, particularly while turning.

Figure 7:
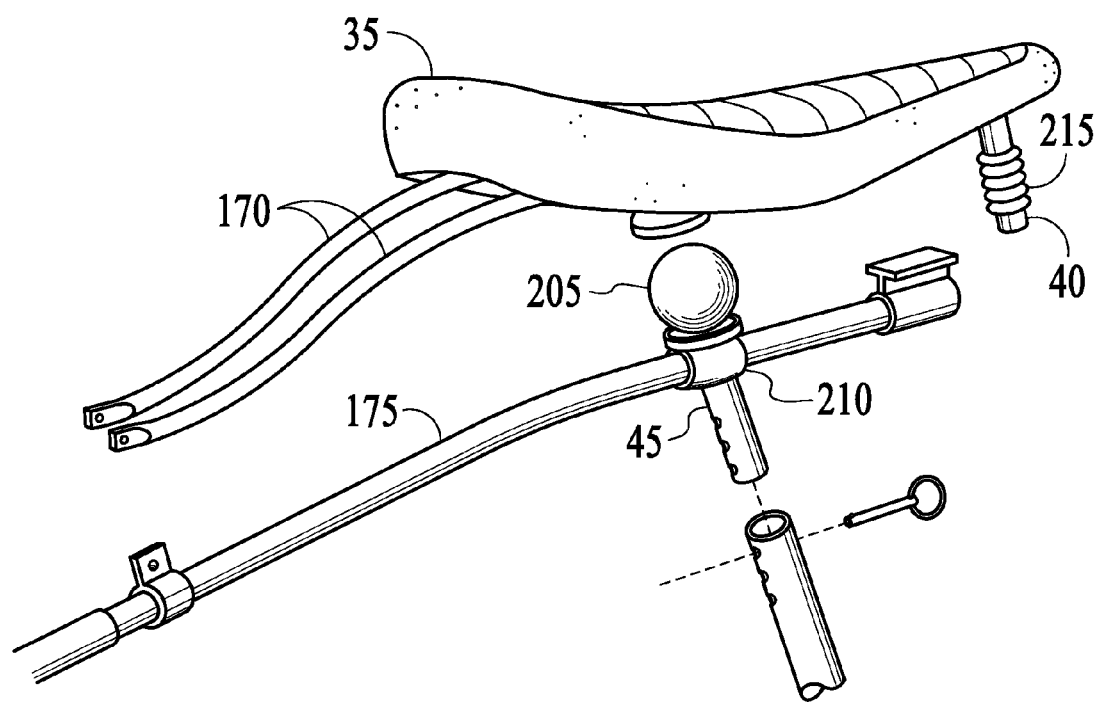
FIG. 7 is an exploded perspective view of the shock absorbing system.

An improved wheelie bar system 165 is illustrated that includes, at least two suspension bars 170 affixed to seat 35. Suspension bars 170 extend from seat 35 to terminate, by a securing means, to a wheelie bar 175; in one specific embodiment, the securing means is a plurality of clamps, however, may be by welding or other method of reliable affixation. Wheelie bar 175 is affixed to rear seatpost 45 and the forwardmost end 177 resting under seat 35, preferably recessed in a sleeve or bracket underneath seat 35. In one embodiment, illustrated by FIG. 7, wheelie bar 175 passes through an aperture defined through a modified rear seatpost 45 and is recessed in a sleeve or bracket under seat 35. In one embodiment, wheelie bar 175 extends rearwardly, terminating in a substantially cylindrical skidplate 180. In an alternative embodiment, illustrated by FIG. 6, skidplate 180 is substantially T-shaped. In this embodiment, wheelie bar 175 terminates in a flattened T-shaped member to form a laterally projecting skidplate mounting 185. A corresponding skidplate surface 190 is screwably affixed to the skidplate mounting 185. In one embodiment, cylindrical skidplate 180 and skidplate surface 190 is comprised of ABS plastic. A wheelie wheel axle 195 passes through a relatively rearward portion of wheelie bar 175. A plurality of wheelie bar wheels 200 are mounted on axle 195, on either side of wheelie bar 175, the wheels being freely rotatable on axle 195. The combination of wheelie bar wheels 200 and skidplate 180, and in an alternative embodiment, skidplate surface 190, permit an advantageous functioning of the wheelie bar system. In an alternative embodiment, a singular wheelie bar wheel 200 is utilized.

In an alternative embodiment, the coupling between frame 10 and said seat 35 is comprised of rear seatpost 45 the first rear seatpost end coupled to frame 10, the second rear seatpost end forming a hollow tube. A washer, preferably concave, is disposed within the hollow second seatpost end such that, in a preferred embodiment, the concave depression forms a recess. An underseat shock absorbing means 205, such as an elastomeric sphere, is disposed on top of the washer. A second, preferably concave, washer is placed in a recessed portion of seat 35, such that the sphere fits snugly between the two preferably concave washers, the concave surface disposed toward the sphere. In an alternative embodiment, illustrated in part by FIG. 7, the terminal aspect of rear seatpost 45 is formed of an apertured hub 210 which permits the wheelie bar to pass therethrough. The top of this apertured hub 210 is shaped to form a concave recess which accommodates the embodiment elastomeric sphere 205. A concave washer is disposed on top of said sphere and the seat disposed on top of said concave washer. In an alternative embodiment, illustrated by FIG. 7, front seatpost 40 is modified to form a lateral shock absorber 215 comprised of two fused cylindrical tubular elements containing a biasing member or deformable member therein, and in one specific embodiment a spring is utilized. In an alternative embodiment, an in-line shock absorber is disposed along the length of wheelie bar 175, where the shock absorber or a subsequent section of wheelie bar 175 is thereafter coupled to the rear seatpost 45. This absorber may be further assistive in attenuating forces acting along the apparatus's long axis.

As the apparatus is capable of 360 degree rotational wheelies, where the user has engaged in a rotational wheelie, and the front wheel contacts the ground, lateral shock absorber 215 attenuates yawing forces encountered when front wheel 25 makes relatively abrupt contact with the ground. The lateral shock absorber 215 is additionally helpful in facilitating the return to the resting pitch (front and rear wheels are on the ground). Shock absorber 205 likewise operates to minimize transmission of these forces as well. The shock absorber facilitates not only a more comfortable ride, but permits optimal shifting of the rider's center of mass during turning, actuation of lever system 140, intentional body roll, or any combination of these factors; the result being a more stable, secure, and safe apparatus for riders, particularly riders with any degree of motor impairment. The shock-absorbing scheme detailed above permits a smoother, safer, and more refined apparatus use, and prevents the user from falling through a concerted attenuation of roll pitch and yaw forces.

To prevent the dreaded consequences associated with apparatus tipping, a series of optimal exemplar embodiment configurations, tailoring rider weight to apparatus weight and other apparatus dimensions is disclosed. Tailoring rider weight to apparatus weight and dimensions maximizes stability, improves safety, improves apparatus athletic utility, and improves apparatus functioning. The rider's center of gravity is located on the seat and behind the rear axle and assists in providing apparatus stability and dynamic stability. For example, Group 1 riders weigh approximately 25-60 lbs, Group 2 riders weigh approximately 65-100 lbs, and Group 3 riders weigh 110-140 lbs. An apparatus of appropriate mass and dimensions is disclosed that generally corresponds to each group. Riders weighing between 101-109 lbs are frequently in a transition stage, and it is believed that these individuals benefit from testing to determine the most appropriate apparatus size to fit their needs. A more athletic or muscular child will often benefit from use of the apparatus applicable to Group III riders. In contrast, a less qualified child may struggle with the larger apparatus, and is more appropriately fitted to an apparatus intended for Group II riders.

Group I apparatus dimensions are specified for a rider weight in the range of about 30-60 lbs and an apparatus weight of about 30 lbs. These configurations will result in the rider/apparatus center of mass located on the rider's seat approximately 14 inches from the ground and about 17 inches from the rearmost portion of wheelie bar 175, where the wheelie bar total length is about 25 inches. When not in use, the resting wheelie bar wheel height, defined as the distance from that portion of the wheelie bar wheels 200 closest to the ground to the ground, is about 2-4 inches. Axle 120 to ground height is about 5.5 inches. The rear-wheel wheelbase, defined as the distance between the center of each rear tire, measures about 20 inches. The rear-to-front distance, defined as the centermost portion of rear wheels 125 to the centermost portion of front wheel 25, is about 26 inches. The rear-to-wheelie wheel distance, defined as the centermost portion of rear wheels 125 to the centermost portion of wheelie bar wheels 200 is about 17 inches. An advantageous front and rear wheel diameter for Group I riders has been found to be about 12 inches.

Group II apparatus dimensions are specified for a rider weight in the range of about 65-100 lbs and an apparatus weight of about 55-60 lbs. These configurations will result in the rider/apparatus center of mass located on the rider's seat approximately 20 inches from the ground and about 23 inches from the rearmost portion of wheelie bar 175, where the wheelie bar total length is about 36 inches. When not in use, the resting wheelie bar wheel height, defined as the distance from that portion of the wheelie bar wheels 200 closest to the ground to the ground, is about 8 inches. Axle 120 to ground height is about 7.5 inches. The rear-wheel wheelbase, defined as the distance between the center of each rear tire, measures about 28 inches. The rear-to-front distance, defined as the centermost portion of rear wheels 125 to the centermost portion of front wheel 25, is about 37 inches. The rear-to-wheelie wheel distance, defined as the centermost portion of rear wheels 125 to the centermost portion of wheelie bar wheels 200 is about 25 inches. An advantageous front and rear wheel diameter for a Group II apparatus has been found to be about 16 inches.

Group III apparatus dimensions are specified for a rider weight in the range of about 110-140 lbs and an apparatus weight of about 70 lbs. These configurations will result in the rider/apparatus center of mass located on the rider's seat approximately 20 inches from the ground and about 25 inches from the rearmost portion of wheelie bar 175, where the wheelie bar total length is about 38 inches. When not in use, the resting wheelie bar wheel height, defined as the distance from that portion of the wheelie bar wheels 200 closest to the ground to the ground, is about 1.5-5 inches. Axle 120 to ground height is about 9 inches. The rear-wheel wheelbase, defined as the distance between the center of each rear tire, measures about 28 inches. The rear-to-front distance, defined as the centermost portion of rear wheels 125 to the centermost portion of front wheel 25, is about 42 inches. The rear-to-wheelie wheel distance, defined as the centermost portion of rear wheels 125 to the centermost portion of wheelie bar wheels 200 is about 26 inches. An advantageous front and rear wheel diameter for a Group III apparatus has been found to be about 20 inches.

It should be noted that in one preferred embodiment, the seat 35 and center of mass are located about 14 inches from the ground (for Group I riders), and about 20 inches from the ground (for Group II and Group III riders). This configuration optimizes stylistic riding and, in particular, wheelies and rotational stylistic riding. In an alternative embodiment, the seat 35 and center of mass are located about 11 inches from the ground (for Group I riders) and 17 inches from the ground (for Group II and Group III riders). This configuration optimizes speed and stability of the rider/apparatus combination. When used in the enhanced speed and stability mode, seat 35 is lowered as disclosed above. The attached wheelie bar, in a preferred embodiment, will also be lowered and therefore that portion of the wheelie bar wheels 200 closest to the ground, is lowered to about 1-2 inches (for Group I riders) and to about 3-4 inches (for Group II and Group III riders).

The above outlined guidelines suggest an approximation for the optimum positioning of the rear wheels, front wheels, wheelie bar, and wheel base. It is important to note, however, that each individual possesses unique abilities and disabilities. While two users may have the same mass, they may have different abilities and limitations. For example, a child with a unilateral motor deficit may tend to slump in one direction, whereas a child of equal mass may have a contractile/spastic tone that causes a different body posture and center of mass relative to the apparatus. Therefore, it is helpful to tailor apparatus to a specific child or rider where possible and is accomplished through ballast approximation followed by a verification of apparatus suitability for a particular individual. In this verification, the user is seated on the apparatus and performs a variety of diagnostic verification challenge maneuvers to ensure the apparatus is an appropriate fit and will not tip under the stress of appropriate and normal use.

In a further therapeutic use regime, a method of stretching tendons, including specifically stretching heel cords in conjunction with the apparatus is disclosed. The user's feet are secured on the tricycle pedals 100, an assistant extends the rider's legs, on at a time, to the furthest possible position (i.e. crank and pedal closest to the ground) on either side. This serves to extend the rider's heel cords in preparation for apparatus use and stimulate the heel cords generally. Additionally, the user may next warm-up by performing a series of stationary wheelies. Additionally still, the user may then exert upward and/or downward pressure on one or more of handles of the dual wishbone lever system 140. One particular problem which may be frequently encountered is the tendency for a user's knees to rub together over the frame when pedaling the apparatus. To ameliorate this problem, a pair of sleeves may be fitted over a user's thighs, wherein the sleeves contain one or more attachment rings (such as a D ring). At least two elastic cords (e.g. Bungee cords) have a first end and a second end, wherein said first end is attached to at least one ring and said second end attached to said frame laterally, either through winding around the frame, or through hooking to a specific location on the frame. The position on the frame is lateral to the resting portion of said user's thighs; this will ensure there is an outwardly directed countertraction/force component. This permits outwardly directed force or traction to distract the user's knees and prevent them from rubbing together while pedaling.

Regarding apparatus use, the combination of the features permits the user to perform multiple maneuvers with the apparatus including but not limited to: rapid cornering and turning ability, enhanced apparatus speeds, evasive maneuvering, responsive front end pitching, forward and backward wheelies, rotational wheelies through a 360 range, multiple revolution wheelies including, as examples, 540, 720 degree spins, and high velocity wheelie spins. This results in enhanced motivation, self satisfaction, and quality of life imparted to a disabled user able to perform impressive physical maneuvers.

The turning and cornering abilities are performed through actuation of the lever system 140 as described above. The pitching, or wheelie, is performed through pulling backwardly on the handlebars and/or leaning backwardly, and made possible through aspects of the apparatus as disclosed. The rotational forward wheelies may generally be performed through the user pulling back on handlebars 30 or a handle in lever system 140, or a combination of both. Through pedaling backward, a user may perform 180, 360, 540, and 720 degree spins. Other exciting, interesting, and therapeutic maneuvers may be performed through a combination of braking, actuation of levers, leaning, and momentum. The possibilities are dependent on the varied needs, desires, and abilities of an individual child using the apparatus.

Although the present invention has been described with reference to the preferred embodiments, it should be understood that various modifications and variations can be easily made by those skilled in the art without departing from the spirit of the invention. Accordingly, the foregoing disclosure should be interpreted as illustrative only and is not to be interpreted in a limiting sense. It is further intended that any other embodiments of the present invention that result from any changes in application or method of use or operation, method of manufacture, shape, size, or material which are not specified within the detailed written description or illustrations contained herein yet are considered apparent or obvious to one skilled in the art are within the scope of the present invention.

I claim:

1. A therapeutic tricycle comprising:
   a rigid frame;
   a fork extending downdwardly from and coupled to said frame;
   a front wheel coupled to the terminal aspect of said fork;

a steering means wherein said fork and said coupled front wheel are pivotable through manipulation of said steering means;
a pedal powered drive train means coupled to said frame;
a rear axle coupled to a substantially rearward portion of said frame, said rear axle engaging a portion of said drive train means;
a pair of rear wheels rotatably mounted upon said rear axle wherein said rear wheels are powered through said pedal powered drive train means;
a seat coupled in at least one location to said rigid frame;
a lever fixedly attached to said rigid frame oriented in a substantially horizontal plane relative to the ground and the lever's long axis being substantially perpendicular to the frame's long axis, wherein a central portion of said lever is affixed to said frame and the terminal aspect of said lever is vertically movable through user applied upward or downward manual force exerted on a substantially terminal aspect of said lever;
wherein said lever is clampably coupled to a substantially horizontal portion of said frame, wherein the terminal aspects of said lever are branched to form a pair of forwardmost handles and a pair of lateral handles, said forwardmost handles pointing substantially toward the front of said frame and said lateral handles pointing substantially laterally, wherein said clampably coupled lever is disposed substantially over said rear axle, wherein when said clampable couplers are loosened, said lever is rotatably adjustable about its central axis.

2. A therapeutic tricycle comprising:
a rigid frame;
a fork extending downwardly from and coupled to said frame;
a front wheel coupled to the terminal aspect of said fork;
a steering means wherein said fork and said coupled front wheel are pivotable through manipulation of said steering means;
a pedal powered drive train means coupled to said frame;
a rear axle coupled to a substantially rearward portion of said frame, said rear axle engaging a portion of said drive train means;
a pair of rear wheels rotatably mounted upon said rear axle wherein said rear wheels are powered through said pedal powered drive train means;
a seat coupled in at least one location to said rigid frame;
a lever fixedly attached to said rigid frame oriented in a substantially horizontal plane relative to the ground and the lever's long axis being substantially perpendicular to the frame's long axis, wherein a central portion of said lever is affixed to said frame and the terminal aspect of said lever is vertically movable through user applied upward or downward manual force exerted on a substantially terminal aspect of said lever;
an elongated rigid bar affixed to seat coupling, said bar extending rearwardly from said seat coupling relative to the front end of said frame; a wheelie wheel axle passing horizontally through a substantially terminal aspect of said bar; at least one wheelie bar wheel disposed on said wheelie wheel axle and rotatably mounted thereon; at least two suspension bars affixed to said seat and extending therefrom to terminate secured to said elongated rigid bar.

3. The tricycle according to claim 2, further comprising a shock absorbing means placed under said seat.

4. The tricycle according to claim 3, wherein said shock absorbing means is comprised of a cylindrical front seatpost with a first end and a second end and a cylindrical rear seatpost with a first end and second end, each seatpost coupled to said frame at the first end, wherein the front seatpost is comprised of two fused cylindrical tubular elements containing a biasing member enclosed therein; the rear seatpost having a first washer disposed within the hollow center of said second rear seatpost end; a shock absorbing sphere disposed on top of said washer, a second washer disposed on top of said sphere, and said seat being disposed on top of said second washer and said second end of the front seatpost.

5. The tricycle according to claim 2, further comprising a skid plate affixed to the terminalmost aspect of said elongated rigid bar.

6. The tricycle according to claim 2, further comprising: an integrally formed rigid bracket having a portion of which mounted said frame and a portion disposed substantially perpendicularly, wherein said perpendicular portion has a centermost aperture and two lateral apertures; a removable pin insertable through said centermost aperture the terminal portion of said pin passing through a suitably sized aperture in said fork; a pair of rubberized limiters having a rubberized portion and a threadable bolt portion extending substantially perpendicularly from the end of said rubberized portion wherein said bolt portion of limiters are capable of being inserted through said lateral apertures and screwably attached thereto using at least one washer and a nut.

7. The tricycle according to claim 2, further comprising an upper chain guard affixed to said frame; an elongated tubular member affixed to said upper chainguard, wherein a chain forming part of said pedal powered drive train means is disposed within said elongated tubular member.

8. The tricycle according to claim 2, wherein said tricycle weighs about 30 lbs, and wherein the total wheelie bar length is about 25 inches, wherein the distance between said wheelie bar wheel height defined as the distance from that portion of the wheelie bar wheels closest to the ground to the ground, is about 2-4 inches, wherein the distance between the rear axle and the ground is about 5.5 inches, wherein the distance between the center of each rear tire, is about 20 inches, wherein the distance between the centermost portion of rear wheels and the centermost portion of front wheel is about 26 inches, wherein the centermost portion of rear wheels and the centermost portion of wheelie bar wheels is about 17 inches, wherein front and rear wheel diameter is about 12 inches.

9. The tricycle according to claim 2, wherein said tricycle weighs about 55-60 lbs, and wherein the total wheelie bar length is about 36 inches, wherein the distance between said wheelie bar wheel height defined as the distance from that portion of the wheelie bar wheels closest to the ground to the ground, is about 8 inches, wherein the distance between the rear axle and the ground is about 7.5 inches, wherein the distance between the center of each rear tire, is about 28 inches, wherein the distance between the centermost portion of rear wheels and the centermost portion of front wheel is about 37 inches, wherein the centermost portion of rear wheels and the centermost portion of wheelie bar wheels is about 25 inches, wherein front and rear wheel diameter is about 16 inches.

10. The tricycle according to claim 2, wherein said tricycle weighs about 65-70 lbs, and wherein the total wheelie bar length is about 38 inches, wherein the distance between said wheelie bar wheel height defined as the distance from that portion of the wheelie bar wheels closest to the ground to the ground, is about 1.5-5 inches, wherein the distance between the rear axle and the ground is about 9 inches, wherein the distance between the center of each rear tire, is about 28 inches, wherein the distance between the centermost portion of rear wheels and the centermost portion of front wheel is about 42 inches, wherein the centermost portion of rear wheels and the centermost portion of wheelie bar wheels is about 26 inches, wherein front and rear wheel diameter is about 20 inches.

11. A therapeutic special needs adaptive tricycle comprising: a rigid frame; a fork extending substantially downwardly from and coupled to said frame; a front wheel coupled to the substantially terminal aspect of said fork; a steering means wherein said fork and said coupled front wheel are pivotably controlled by said steering means; a pedal powered drive train means coupled to said frame; a rear axle coupled to a substantially rearward portion of said frame; a pair of rear wheels rotatably mounted upon said rear axle wherein said rear wheels are rotated through said pedal powered drive train means; a seat coupled in at least one location to said rigid frame; a lever affixed to said rigid frame and disposed in a substantially horizontal plane, wherein said lever is clampably coupled to a substantially horizontal portion of a tricycle frame wherein said lever and said horizontal portion are substantially parallel, wherein the terminal aspects of said lever are branched to form a forwardmost handle and lateral handle, said forwardmost handle pointing substantially toward the front of said tricycle frame and said lateral handle pointing substantially laterally, wherein said clampably coupled lever is disposed substantially over a rear axle, wherein when said clampable couplers are loosened, said lever is rotatably adjustable about its central axis, an elongated rigid bar affixed the underside of said seat, extending rearwardly relative to said frame; a wheelie wheel axle passing horizontally through a substantially terminal aspect of said bar; at least one wheelie bar wheel disposed on said wheelie wheel axle rotatably mounted thereon; at least two suspension bars mounted to the undersurface of said seat; a skid plate affixed to the terminal aspect of said elongated rigid bar; an integrally formed rigid bracket having a portion of which mounted said frame and a portion disposed substantially perpendicularly, wherein said perpendicular portion has a centermost aperture and two lateral apertures; a removable pin insertable through said centermost aperture; a pair of rubberized limiters having a rubberized portion and a threadable bolt portion extending substantially perpendicular from the end of said rubberized portion wherein said bolt portion of limiters are capable of being inserted through lateral apertures and screwably attached thereto using at least one washer and a nut, an upper chain guard affixed to said frame; an elongated tubular member which affixed to frame or upper chainguard, wherein a chain forming part of said pedal powered drive train means is disposed within said elongated tubular member.

* * * * *